(12) United States Patent
Jakubowski et al.

(10) Patent No.: US 7,721,678 B2
(45) Date of Patent: May 25, 2010

(54) PET SHELTER

(75) Inventors: Chris Jakubowski, Rutland Town, VT (US); James M. Buckley, New Hartford, CT (US); Craig Bures, Prospect, CT (US); Douglas Melville, Jr., Simsbury, CT (US); Paul Corsi, Terryville, CT (US); Phillip Standley, Hartford, CT (US)

(73) Assignee: Pet Gear Inc., West Rutland, VT (US)

( * ) Notice: Subject to any disclaimer, the term of this patent is extended or adjusted under 35 U.S.C. 154(b) by 0 days.

(21) Appl. No.: 11/374,500

(22) Filed: Mar. 13, 2006

(65) Prior Publication Data

US 2007/0000447 A1 Jan. 4, 2007

Related U.S. Application Data

(60) Provisional application No. 60/660,654, filed on Mar. 11, 2005, provisional application No. 60/668,767, filed on Apr. 6, 2005.

(51) Int. Cl.
*A01K 1/02* (2006.01)
*A01K 1/03* (2006.01)
*A01K 31/06* (2006.01)
*A01K 31/10* (2006.01)

(52) U.S. Cl. ........................... 119/474; 119/481

(58) Field of Classification Search ................. 119/474, 119/498, 499, 461, 482, 484, 491, 504, 481, 119/501; 312/323, 322, 109
See application file for complete search history.

(56) References Cited

U.S. PATENT DOCUMENTS

| 4,763,606 | A | * | 8/1988 | Ondrasik, II | 119/474 |
| 5,399,010 | A | * | 3/1995 | McClung et al. | 312/334.1 |
| 5,653,194 | A | * | 8/1997 | Guy | 119/453 |
| 5,803,018 | A | * | 9/1998 | Liou | 119/461 |
| 6,408,797 | B2 | * | 6/2002 | Pivonka et al. | 119/498 |
| 6,460,486 | B1 | * | 10/2002 | Powers et al. | 119/452 |
| 6,997,138 | B1 | * | 2/2006 | Simpson | 119/499 |

* cited by examiner

*Primary Examiner*—Michael R Mansen
*Assistant Examiner*—Monica Williams
(74) *Attorney, Agent, or Firm*—Volpe and Koenig, P.C.

(57) ABSTRACT

The inventive pet shelter described herein overcomes these drawbacks. The pet shelter has a non-deformable steel cage defining a space therein suitable for the enclosure of a pet and deformable pieces removably attachable to the perimeter of the steel cage. The steel cage has a top shelter section and a side shelter section formed by a guide following door, wherein the guide following door can be recessed into the pet shelter and underneath and adjacent to the top shelter section. The deformable pieces are oriented on corners and edges of the steel cage.

15 Claims, 14 Drawing Sheets

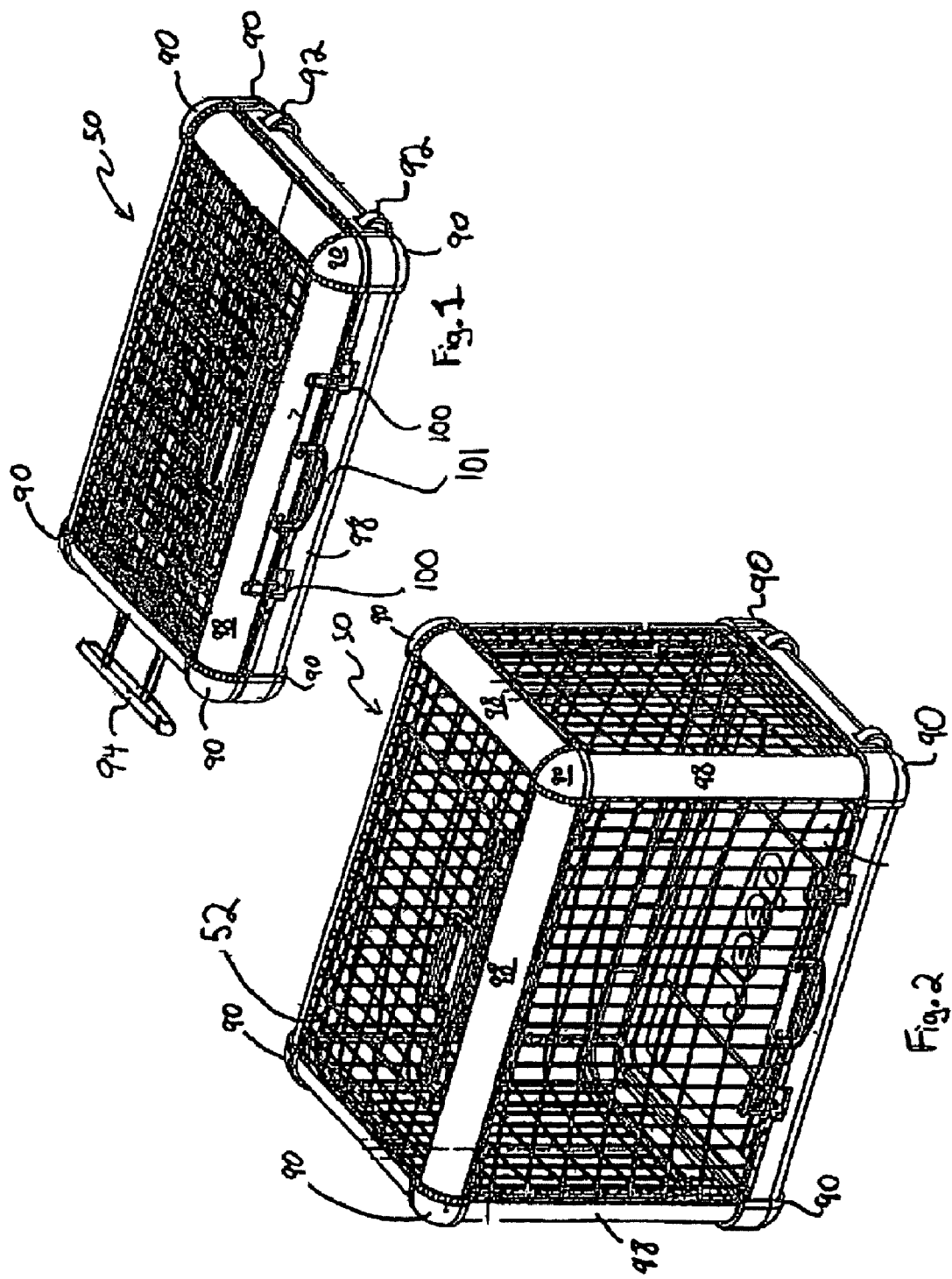

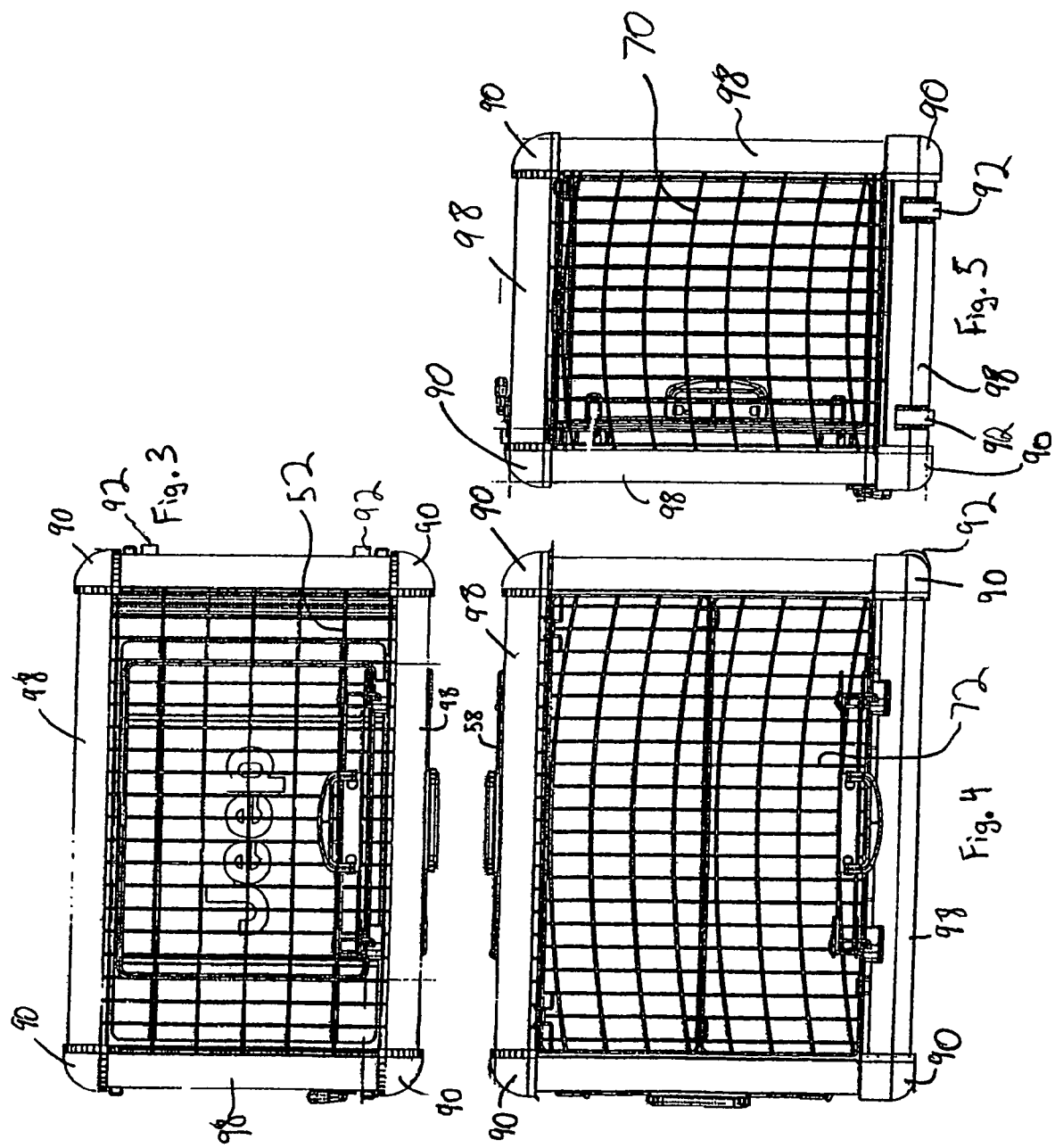

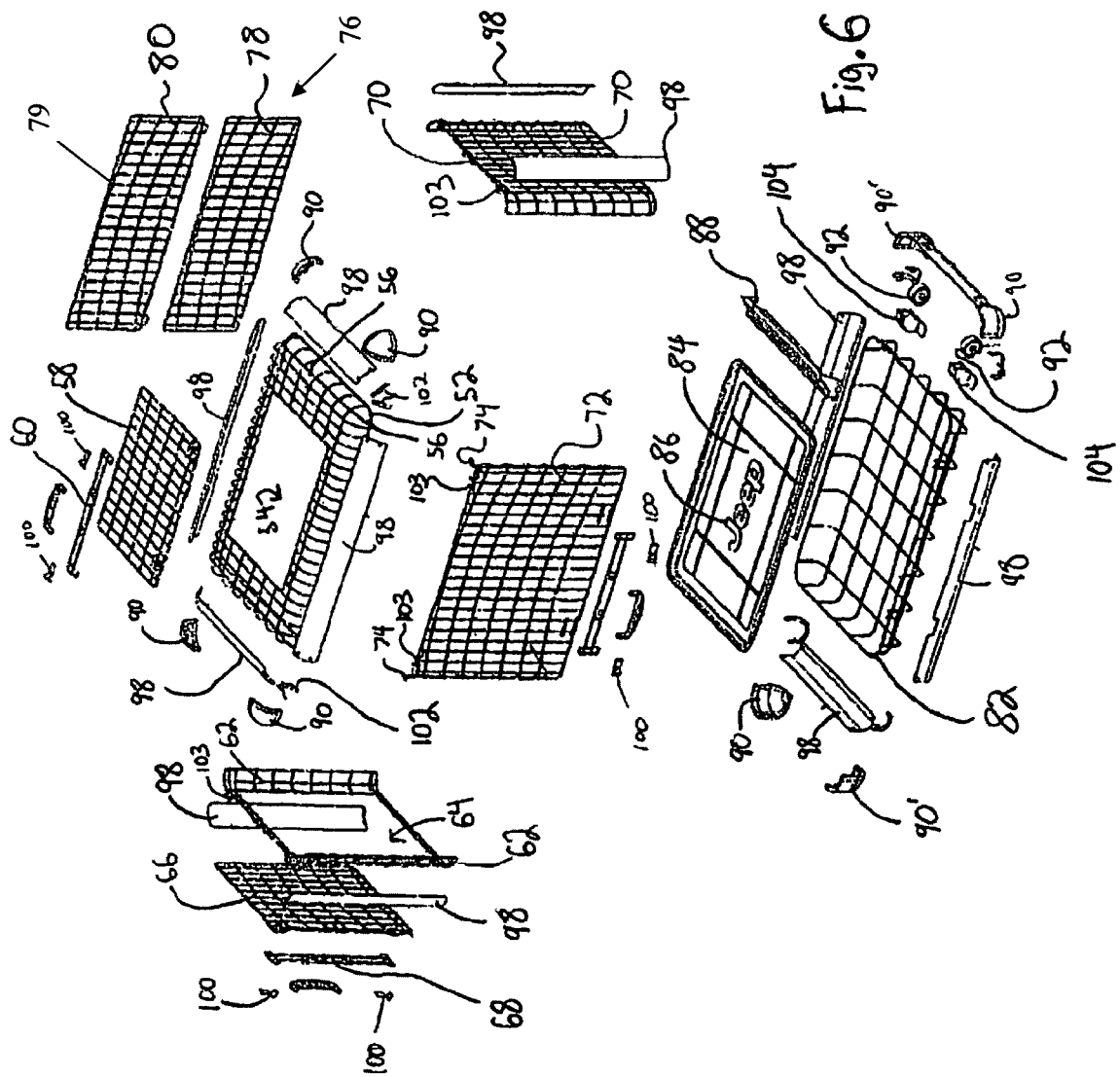

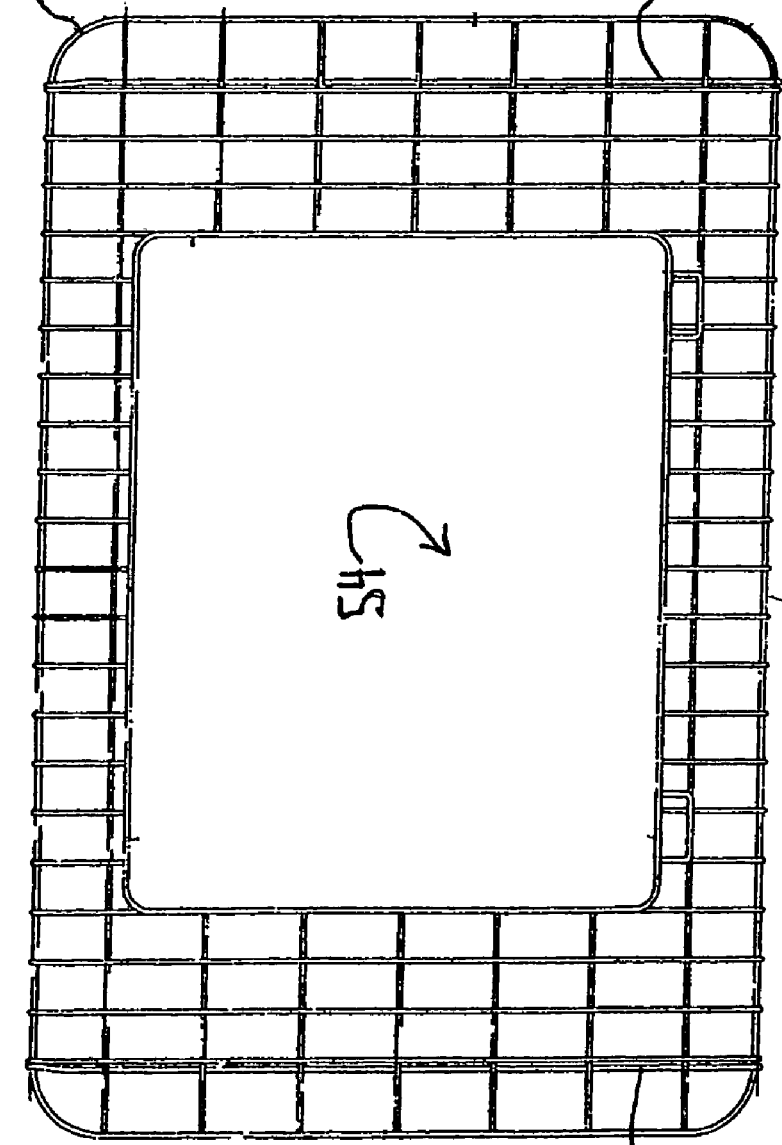

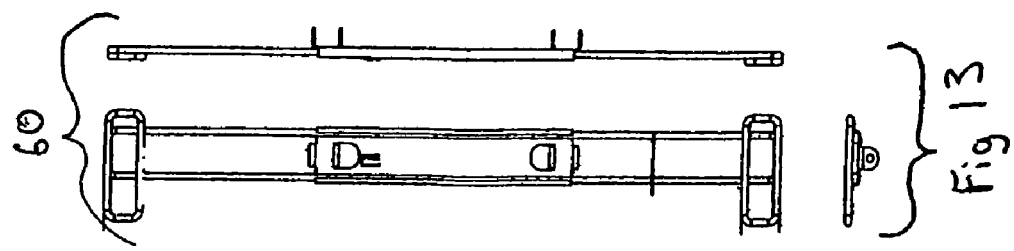
Fig 13
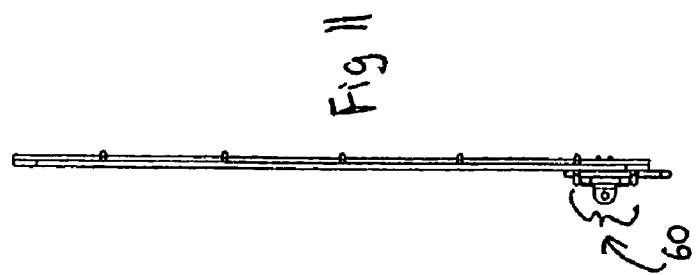
Fig 11
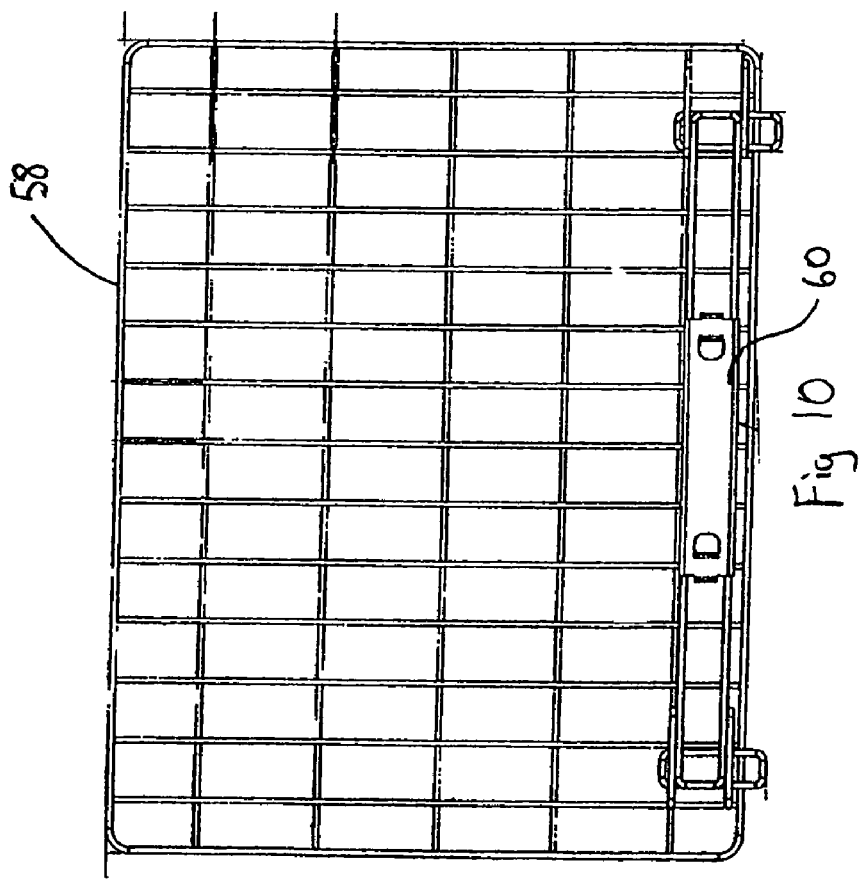
Fig 10
Fig 12

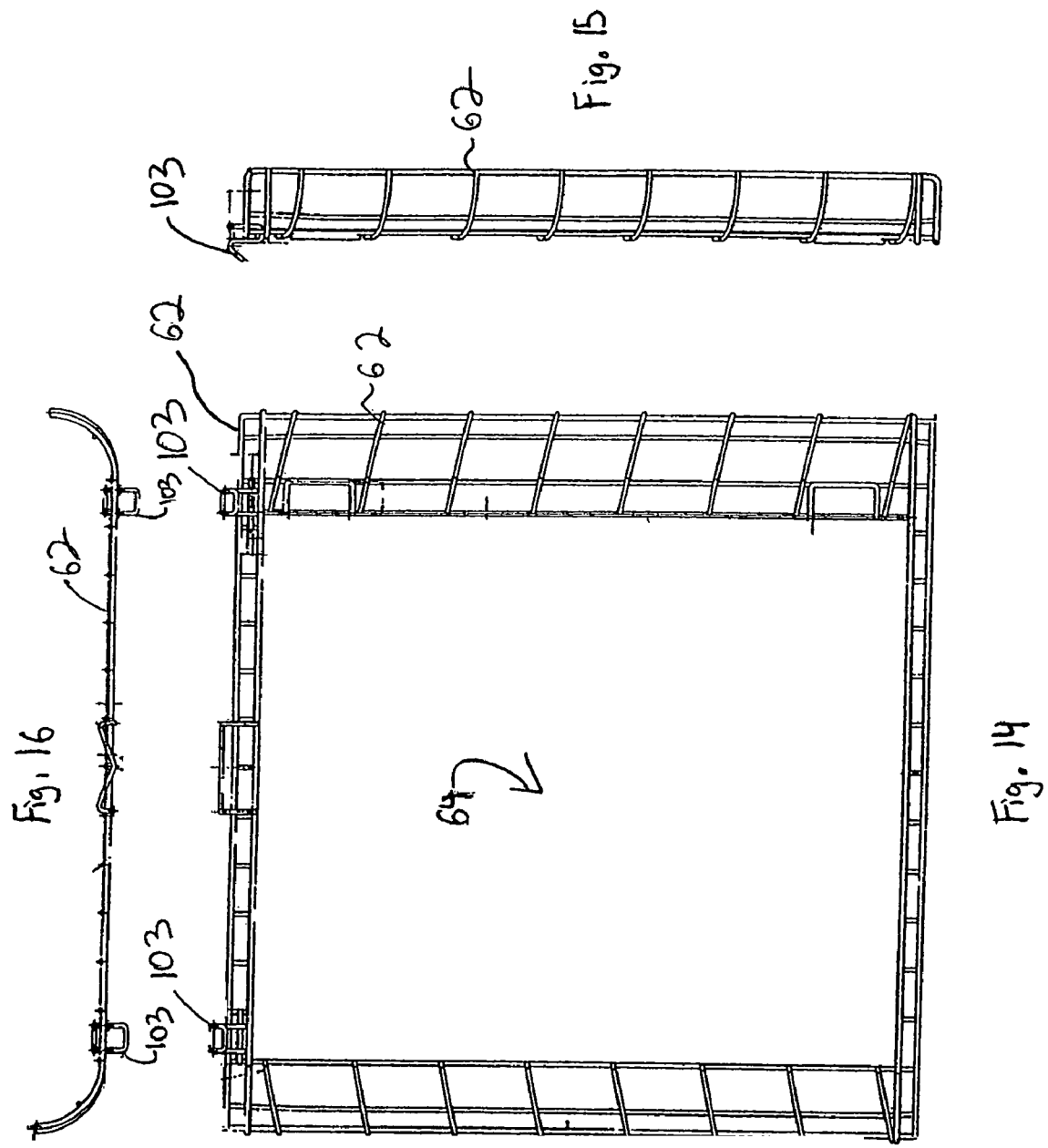

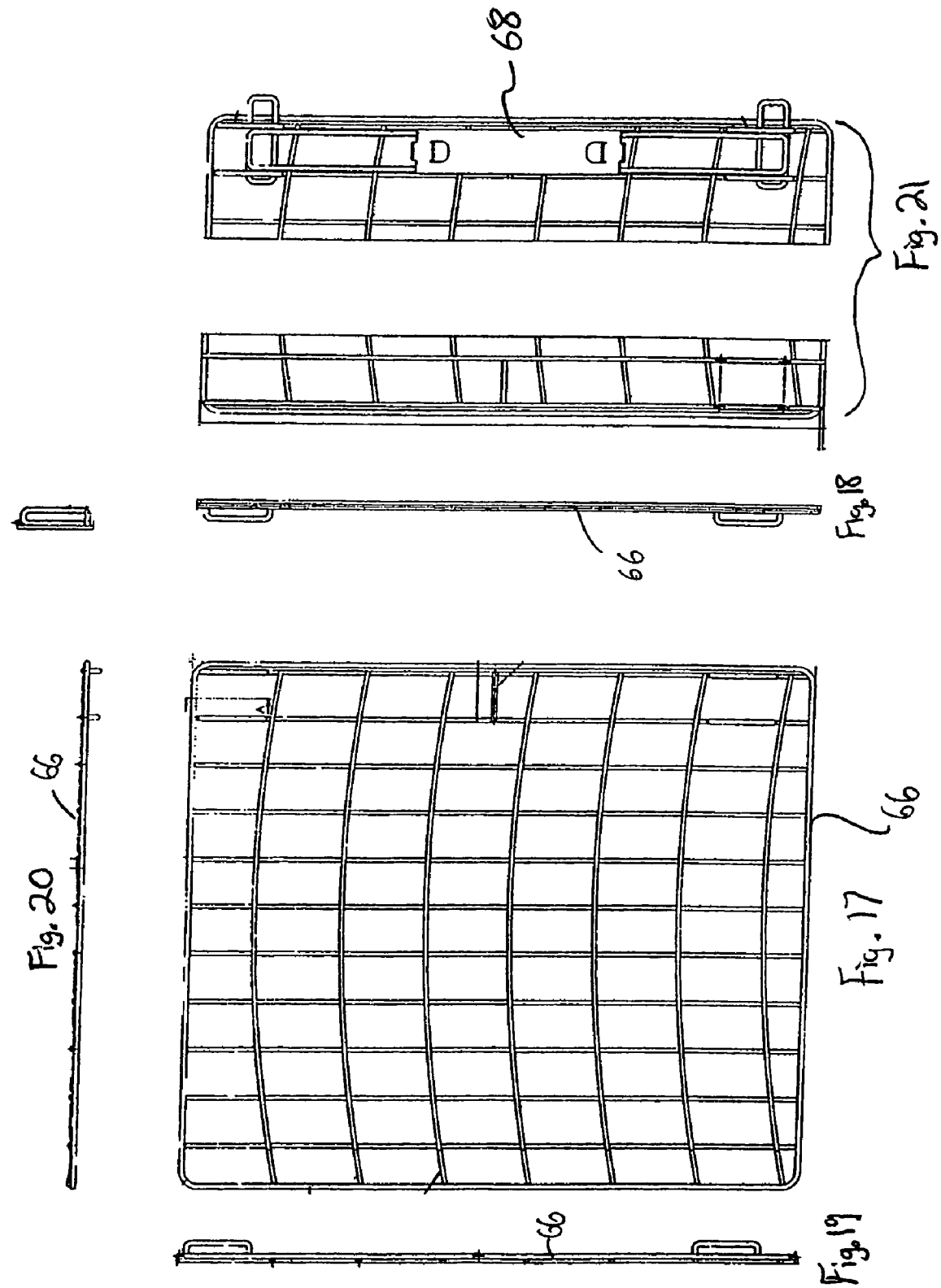

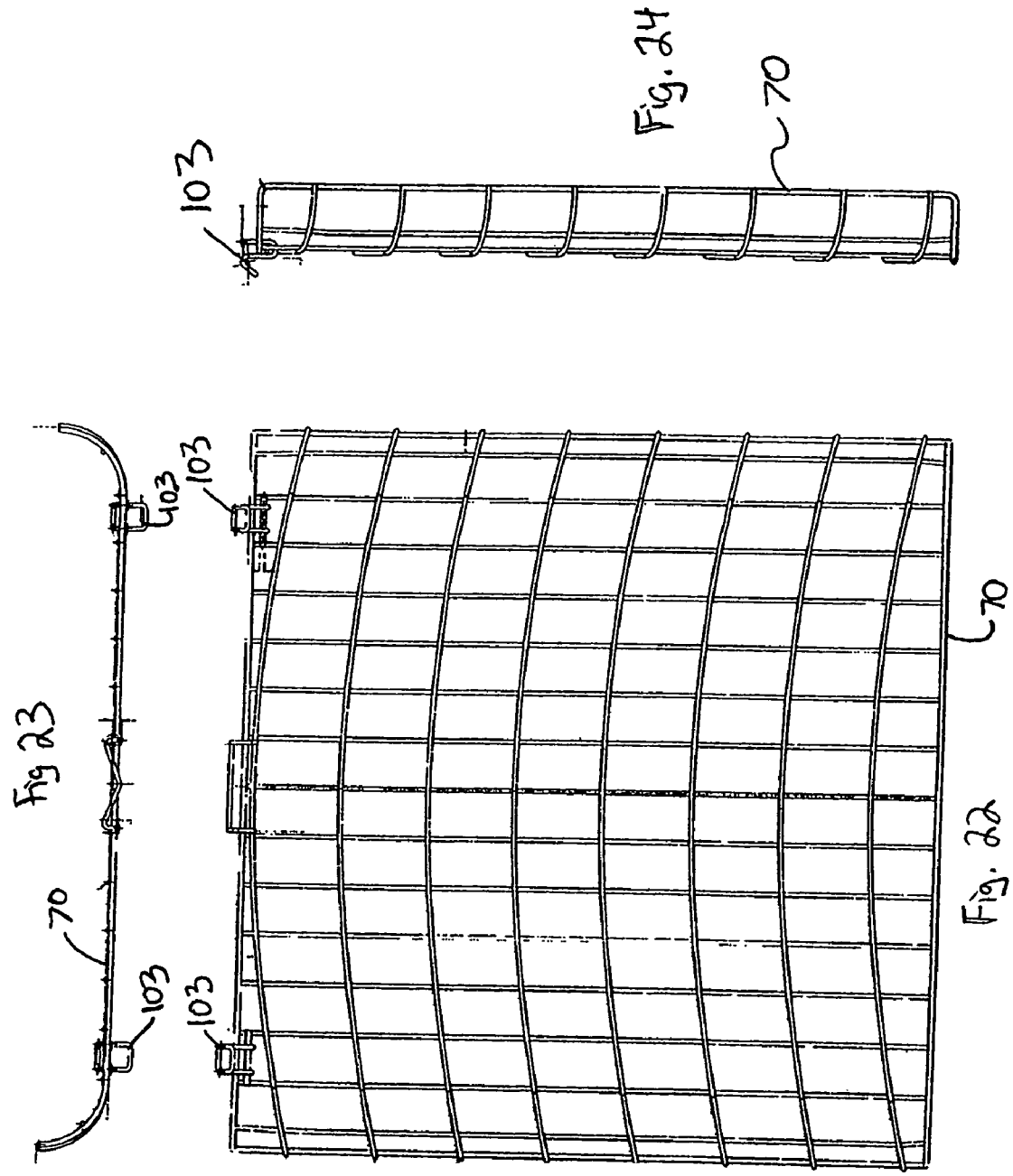

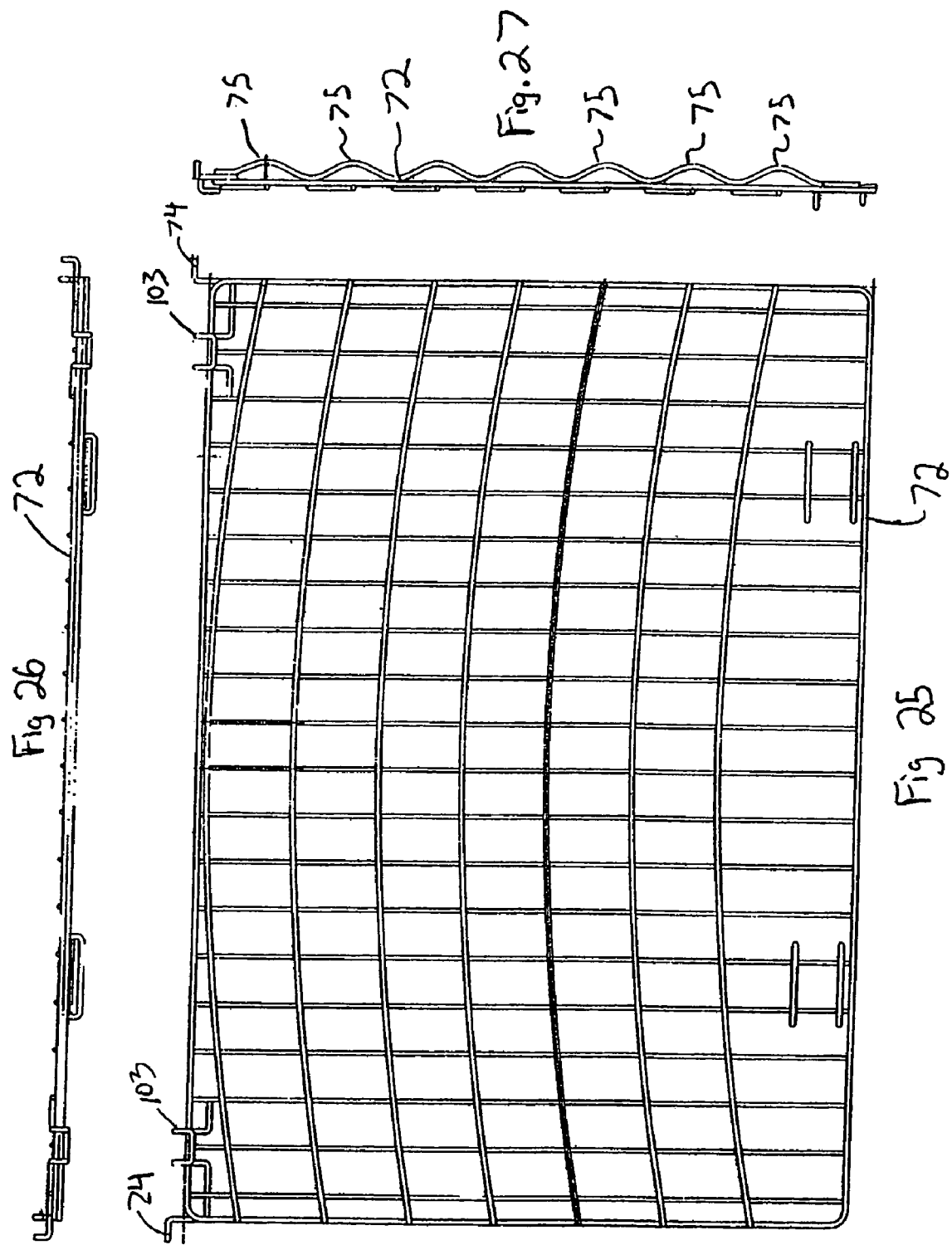

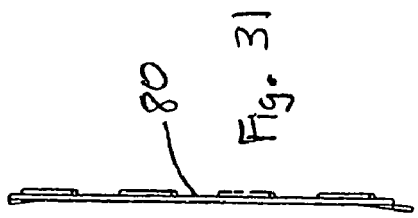
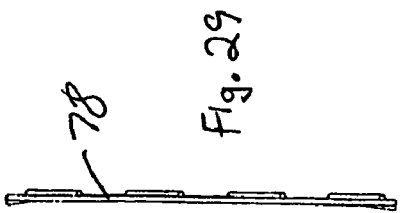
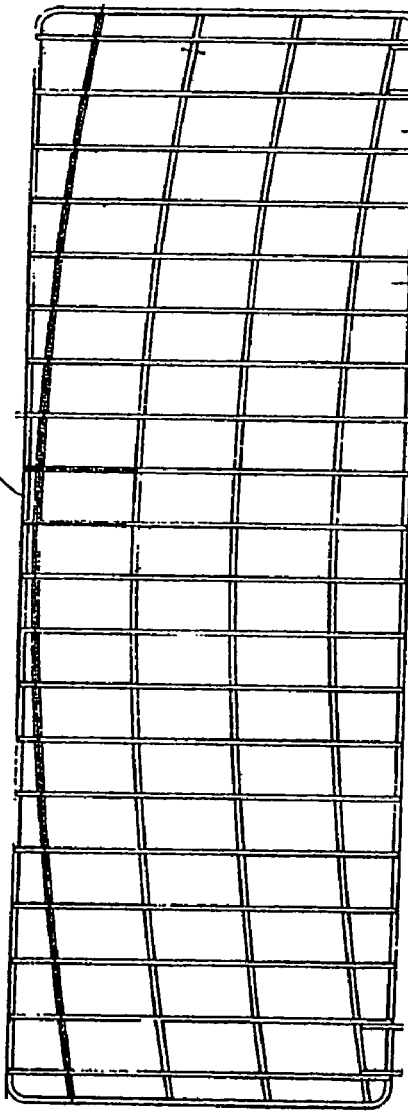
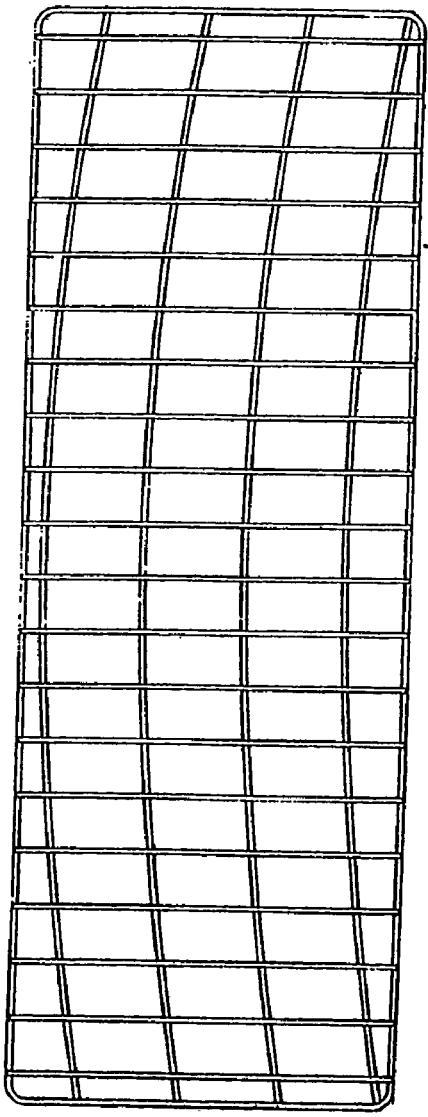

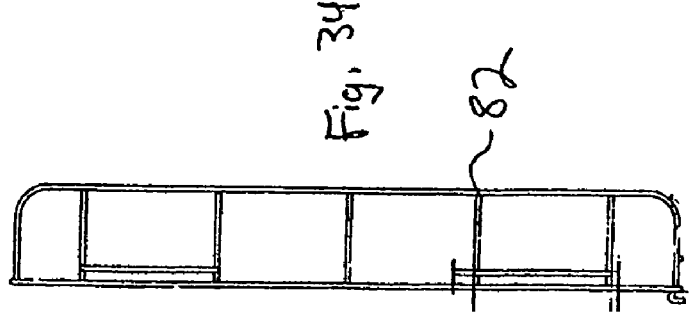
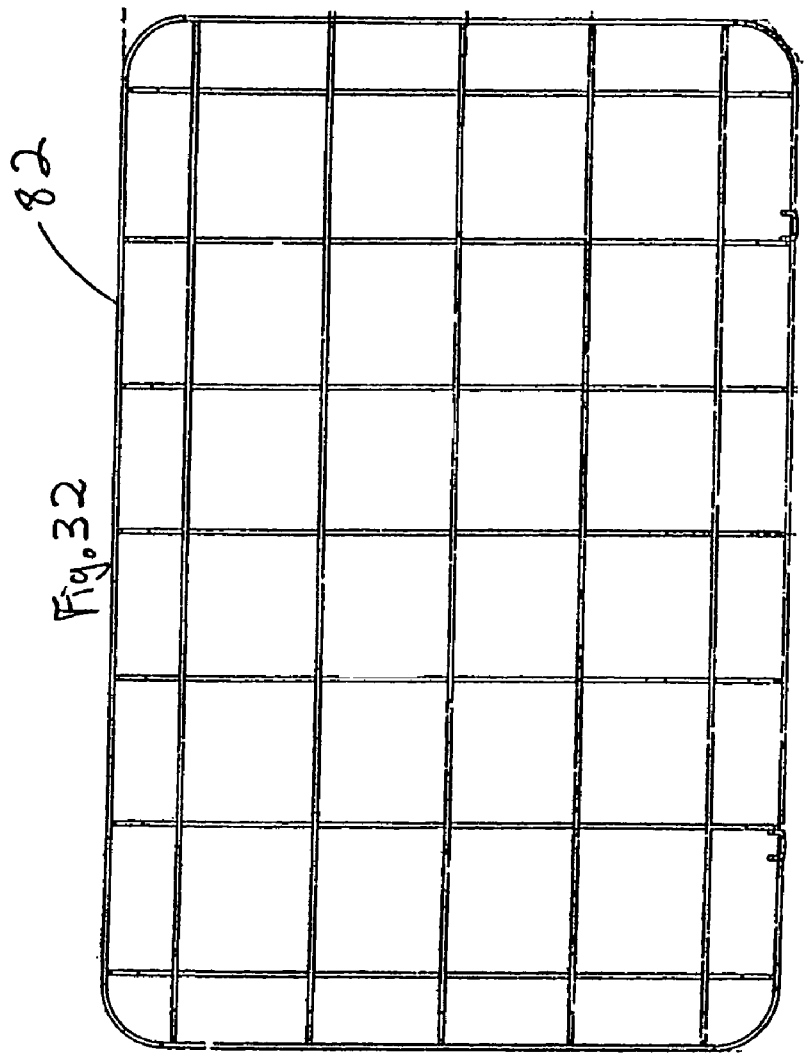
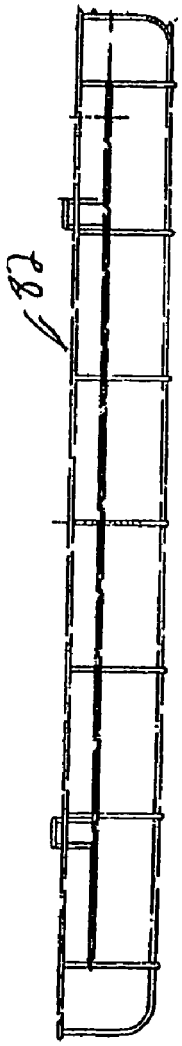

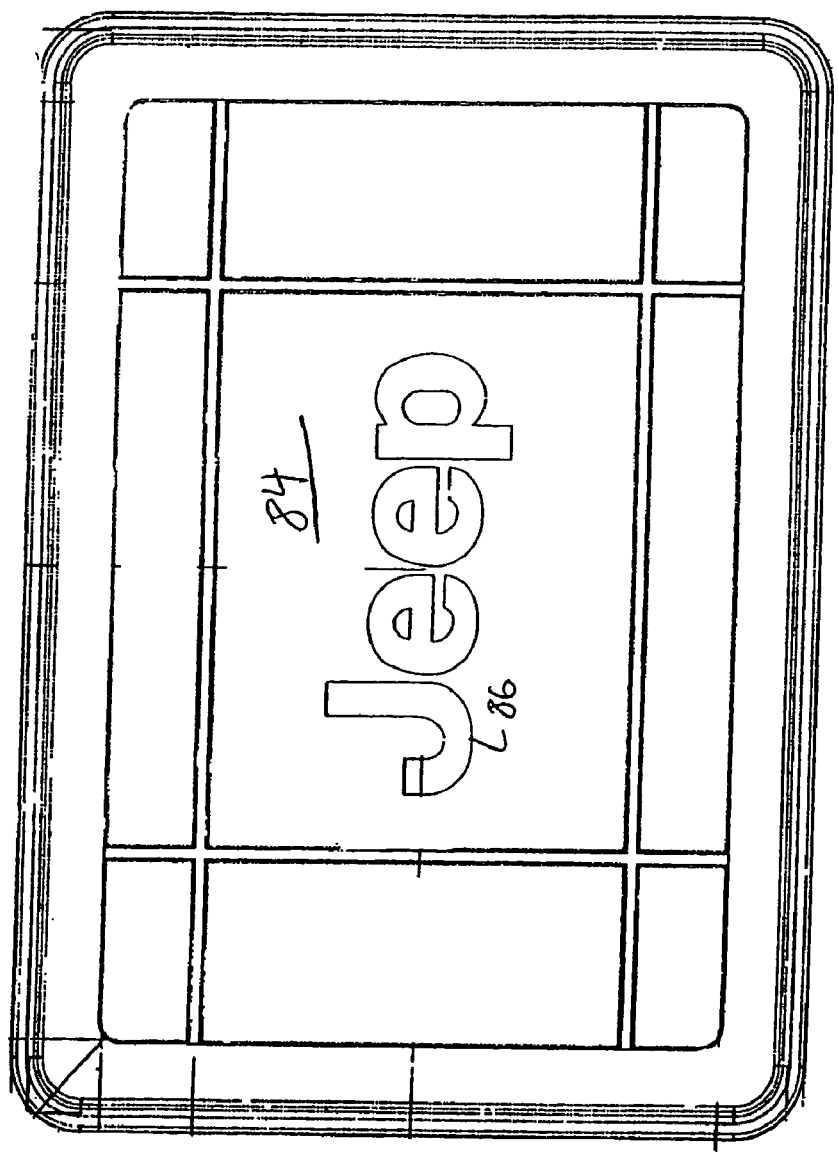
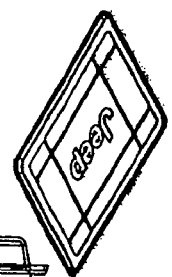
Fig. 37
Fig. 38
Fig. 35
Fig. 36

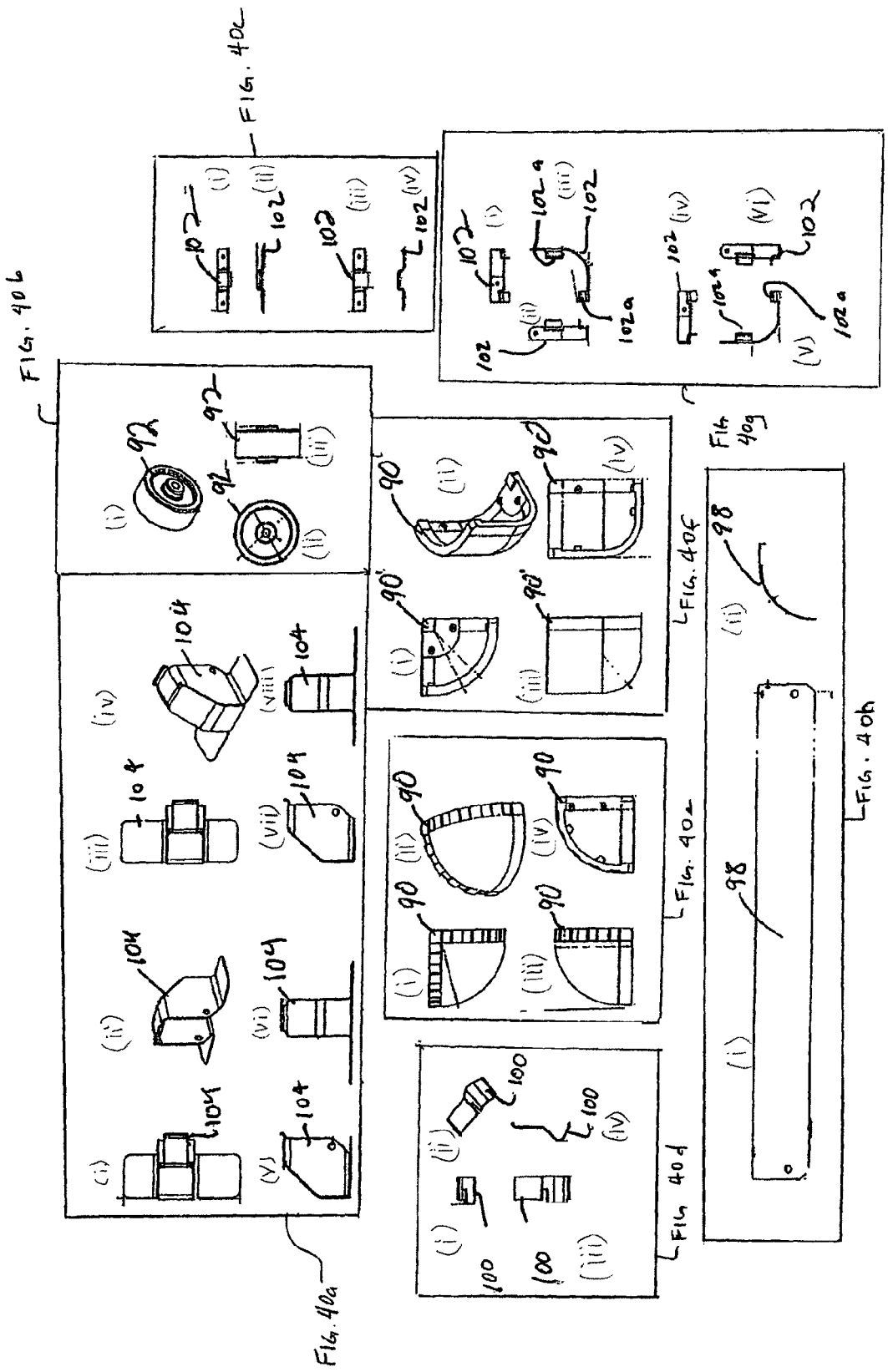

PET SHELTER

CROSS REFERENCE TO RELATED APPLICATION(S)

This application claims the benefit of U.S. Provisional Application Ser. Nos. 60/660,654 AND 60/668,767 filed Mar. 11, 2005 and Apr. 6, 2005 respectively, which are incorporated by reference as if fully set forth.

FIELD OF INVENTION

The field of the invention is pet carriers and pet houses.

BACKGROUND

Pet carriers allow pet owners to travel with their pets without fear of the pets escaping and hurting themselves. In automobiles, the pet carrier insures that the pet will not escape through an open door or window, or interfere with driving. During air travel, they insure that the pet stays safely in one place during the trip.

Pet houses give the pet a safe place to rest. Dogs in particular find comfort in the cave-like comfort of a pet house.

Known pet carriers have several drawbacks. The corners and edges of such open mesh steel carriers are just the cut-ends of the steel. These sharp edges cut and scrape people, automobile upholstery, clothing, the pet being carried, and anything else they catch. Further, especially for larger animals, the size of the pet carrier is enormous, which makes moving the carriers difficult, and almost impossible if the pet is inside the carrier. Finally, most pet carriers have only one door, which provides challenges to the pet owner if the pet is uncooperative or if something blocks one of the doors.

SUMMARY

The inventive pet shelter described herein overcomes these drawbacks. The pet shelter has a non-deformable steel cage defining a space therein suitable for the enclosure of a pet and deformable pieces removably attachable to the perimeter of the steel cage. The steel cage has a top shelter section and a side shelter section formed by a guide following door, wherein the guide following door can be recessed into the pet shelter and underneath and adjacent to the top shelter section. The deformable pieces are oriented on corners and edges of the steel cage.

BRIEF DESCRIPTION OF THE DRAWINGS

The following detailed description of the preferred embodiment of the present invention will be better understood when read with reference the appended drawings. For the purpose of illustrating the invention, there is shown in the drawings an embodiment that is presently preferred. It is understood, however, that the invention is not limited to the precise arrangement and instrumentality shown. In the drawings:

FIG. 1 is a perspective view of a pet shelter according to a preferred embodiment of the present invention illustrating the pet shelter in a first compact configuration that facilitates storage or transport thereof;

FIG. 2 is a perspective view of the pet shelter of FIG. 1 illustrating the pet shelter in a second use configuration ready to receive a pet therein;

FIG. 3 is a top plan view of the pet shelter of FIG. 2;

FIG. 4 is a right side elevational view of the pet shelter of FIG. 2;

FIG. 5 is a rear elevational view of the pet shelter of FIG. 2;

FIG. 6 is an exploded view of the pet shelter of FIG. 2;

FIG. 7 is a front elevational view of a top shelter section of the pet shelter of FIG. 2; the top shelter section preferably defines a top opening therein;

FIG. 8 is a bottom plan view of the top shelter section of FIG. 7;

FIG. 9 is a right side elevational view of the top shelter section of FIG. 7; The broken lines in FIG. 9 illustrate a slotted guide; there are preferably two slotted guides in the top shelter section;

FIG. 10 is the front elevational view of a top door used to seal the opening in the top shelter section of FIG. 7;

FIG. 11 is a right side elevational view of the top door of FIG. 10;

FIG. 12 is a bottom plan view of the top door of FIG. 10;

FIG. 13 illustrates details of a top door latch;

FIG. 14 is a front elevational view of a front shelter section of the pet shelter of FIG. 2; it is preferred that the front shelter section defines a front opening therethrough;

FIG. 15 is a right side elevational view of the front shelter section of FIG. 14;

FIG. 16 is a top plan view of the front shelter section of FIG. 14 and illustrates a preferred curvature of the lateral sides of the front shelter section;

FIG. 17 is a front elevational view of a front door used to seal the front opening in the front shelter section of FIG. 14;

FIG. 18 is a right side elevational view of the front door of FIG. 17;

FIG. 19 is a left side elevational view of the front door of FIG. 17;

FIG. 20 is a top plan view of the front door of FIG. 17;

FIG. 21 illustrates details of a front door latch used with the front door of FIG. 17;

FIG. 22 is a front elevational view of a rear shelter section of the pet shelter of FIG. 2;

FIG. 23 is a top plan view of the rear shelter section of FIG. 22 and illustrates the preferred curved lateral sides of the rear shelter section;

FIG. 24 is a right side elevational view of the rear shelter section of FIG. 22;

FIG. 25 is a front elevational view of a right side shelter section of the pet shelter of FIG. 2; the right side shelter section preferably forms a guide following door that is engaged with the slotted guides in the top shelter section of FIG. 2;

FIG. 26 is a top plan view of the right side shelter section of FIG. 25;

FIG. 27 is a right side elevational view of the right side shelter section of FIG. 25, the bowed portions of the right side shelter section are preferably conFIG. d to create an interference fit with the top shelter section when the right side shelter section is fully recessed into the top shelter section and the two are pressed together;

FIG. 28 is a front elevational view of a bottom bifold section of a left side shelter section of the pet shelter of FIG. 2;

FIG. 29 is a right side elevational view of the bottom bifold section of FIG. 28;

FIG. 30 is a front elevational view of a top bifold section of the left side shelter section of the pet shelter of FIG. 2;

FIG. 31 is a right side elevational view of the top bifold section of FIG. 30; the top and bottom bifold sections of FIGS. 30 and 28 preferably combine to form the left side shelter section of the pet shelter of FIG. 2;

FIG. 32 is a front elevational view of a bottom shelter section of the pet shelter of FIG. 2;

FIG. 33 is a bottom plan view of the bottom shelter section of FIG. 32;

FIG. 34 is a right side elevational view of the bottom shelter section of FIG. 32;

FIG. 35 is a front elevational view of a tray that is preferably inserted inside of the pet shelter of FIG. 2 to provide a comfortable pet surface;

FIG. 36 is a bottom plan view of the tray of FIG. 35;

FIG. 37 is a right side elevational view of the tray of FIG. 35;

FIG. 38 is a reduced perspective view of the tray of FIG. 35;

FIGS. 40a(i)-40h(ii) show multiple views of many components of the pet shelter of FIG. 2 including: wheels, wheel brackets, clips, corner covers, and edge covers.

DETAILED DESCRIPTION OF THE PREFERRED EMBODIMENT(S)

Figure 39:
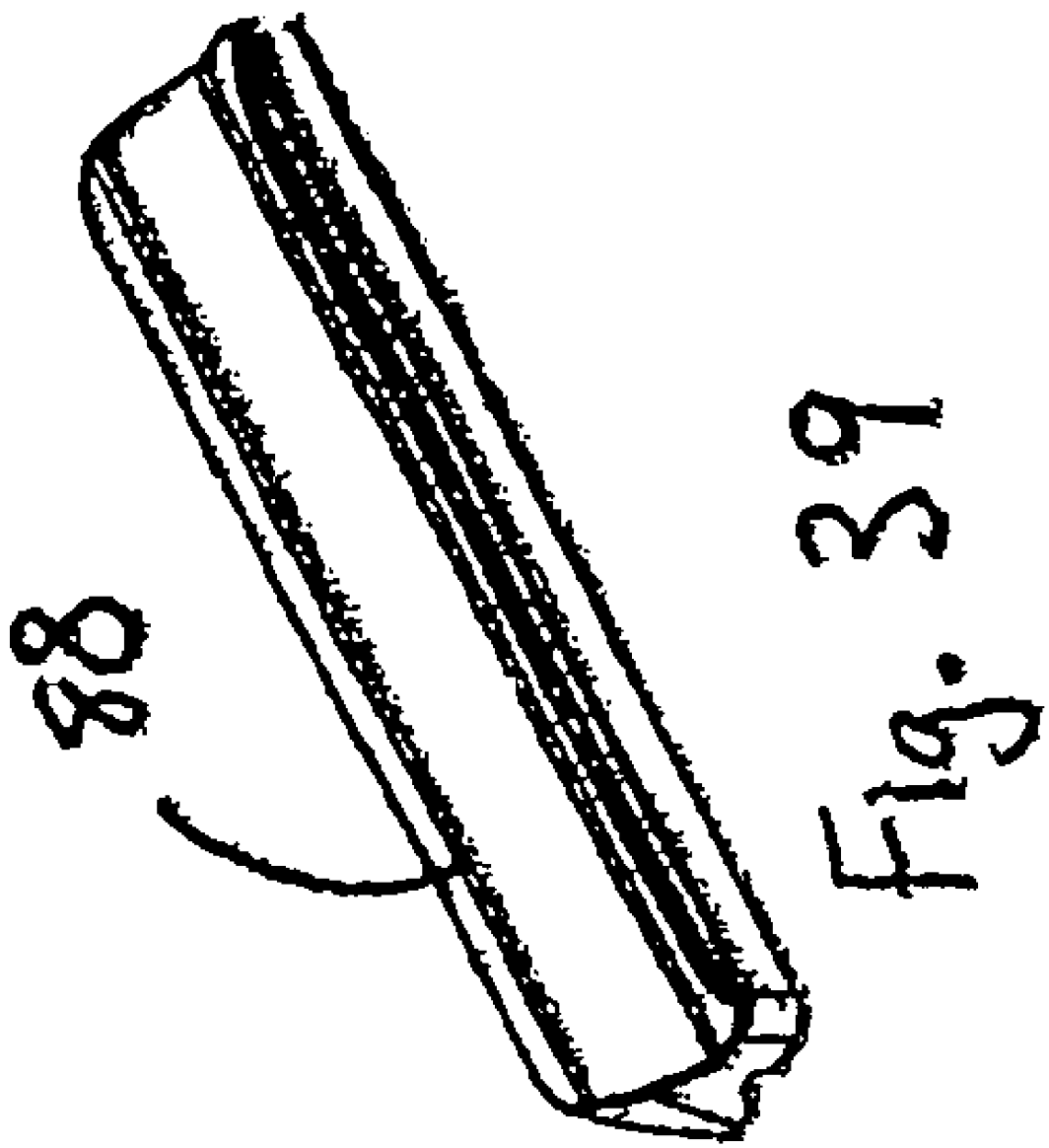
FIG. 39 is a perspective view of an extension that is preferably positioned on the bottom shelter section of the pet shelter for use in conjunction with the tray; the extension protects the wheels from the tray and from a pet that may be trying to dig through the tray to reach the wheels (shown in FIG. 1) of the pet shelter.

Certain terminology is used in the following description for convenience only and is not limiting. The words "right," "left," "top," and "bottom" designate direction in the drawings to which reference is made. The words "inwardly" and "outwardly" refer to directions toward and away from, respectively, the geometric center of the pet shelter and designated parts thereof. The words "a" and "one", as used in the claims and in the corresponding portions of the specification, are defined as including one or more of the referenced item unless specifically stated otherwise. This terminology includes the words above specifically mentioned, derivatives thereof and words of similar import.

Referring to FIGS. 1-40h, wherein like numerals indicate like elements throughout, a preferred embodiment of a pet shelter is shown and generally designated as 50. The pet shelter 50 can be used as a kennel, a pet carrier, a dog house, a pet room, a cage, or the like. It is preferred that the pet shelter 50 is movable between a first compact configuration (shown in FIG. 1) to a second use configuration (shown in FIG. 2). The pet shelter 50 includes multiple features that provide significant improvements over prior pet cages. For example, the pet shelter 50 may include a right side shelter section 72 that forms a guide following door; may include three doors (a top door 58, front door 66, and a guide following door 72 formed by the right side shelter section 72); may include a bifold door; and/or may include plastic, rubber, or similar material corner covers 90 (90' are the bottom corner covers, 90 are the top corner covers) to prevent sliding of the pet shelter 50 due to movement of a pet within the pet shelter 50, and also prevent the wire ends from cutting or scraping people, the pet, and other goods.

Unless otherwise noted, it is preferred that the structure of the pet shelter 50 is formed of a durable, strong, corrosion resistant material such as steel rod stock. Those of ordinary skill in the art will appreciate from this disclosure that any other suitable materials, such as stainless steel, aluminum, alloy, or suitable polymer can be used without departing from the scope of the present invention. The pet shelter of the present invention can be used with any pet, such as dogs, cats, or the like, provided that the pet shelter is properly sized for the particular pet.

Referring to FIG. 1, when the pet shelter 50 is in the first compact configuration, it can preferably be transported as a suitcase or a briefcase depending upon the size of the pet shelter 50. The pet shelter 50 preferably includes wheels 92 along a lateral side to allow easier transport thereof. Additionally a handle 94 can be used in conjunction with the wheels 92 to allow the pet shelter 50 to be pulled behind an owner in a rolling fashion. The handle 94 can be attached to a bottom shelter section 82 of the pet shelter 50; can be retractable into the pet shelter 50; and/or can be detachably engaged with the pet shelter 50.

Referring to FIG. 2, the pet shelter 50 is movable into a second use configuration. When the pet shelter 50 is in the second use configuration, it is ready to receive or house a suitably sized pet. It is preferred that the sections of the pet shelter 50 are formed with a tray 84 placed therein to comfortably support a pet.

Referring to FIGS. 2-6 and 40, edge covers 98 are detachably positioned on the edges of the pet shelter 50 to minimize injury and damage caused by the steel rod stock, and provide a softer, more pleasing look to the pet shelter 50. The edge covers 98 attach to the shelter 50 using clips 101 that have shelter mating portions 102 shaped to mate with the shelter 50, and edge cover mating portions 102a shaped to mate with the edge cover 90, but may be secured using rivets or any other known attachment mechanism.

Corner covers 90 are preferably positioned at the corners of the pet shelter 50 to prevent the pet shelter 50 from damaging objects when the pet shelter 50 is transported into or out of a vehicle or through different rooms in a house, etc. It is preferred that the edge covers 98 and the corner covers 90 are formed by durable, less rigid, material, such as suitable polymer or elastomer.

Those of ordinary skill in the art will appreciate from this disclosure that any suitable material can be used to form the edge covers 98 or the corner covers 90. Additionally, the corner covers 90 and the edge covers 98 can be covered with a padding, rubber layer, or the like to reduce the possibility of damage caused by the pet shelter 50.

Referring to FIGS. 2-6, it is preferred that the corner covers 90 positioned on the bottom shelter section 82 have a generally rubberized outer surface or have an outer surface formed by a material likely to have a high coefficient of friction with surfaces on which the pet shelter 50 is typically positioned to provide anti-skid functionality. This prevents the pet shelter 50 from sliding out of position due to movement of a pet therein or due to vibrations transmitted to the pet shelter, such as those generated by an automobile. The anti-skid corner covers 90 of the pet shelter 50 of the present invention provide a significant advantage over known pet kennels by preventing damage to floors or vehicles due to movement of the pet shelter 50.

Referring to FIGS. 6, 7, and 25, the pet shelter 50 is preferably moved between the second use configuration (shown in FIGS. 2-5) into the first compact configuration (shown in FIG. 1) using the following procedure. A right side shelter section 72 of the pet shelter 50 preferably forms a guide following door that is engaged with the top shelter section 52 of the pet shelter 50. The right side shelter section 72 includes rods 74 on the upper left and right corners that engage the slotted guides 56 in the top shelter section 52. It is preferred that the slotted guides 56 are each formed by a pair of heavy gauge wires or rod stock. However, any known mechanism for providing a slotted guide can be used without departing from the scope of the present invention. When the right side shelter section 72 is extended to form a lateral side wall of the pet shelter, the right side shelter section 72 can be secured using a biased latch or the like.

The top shelter section 52 preferably defines a top opening 54 therein. The opening 54 is closed by a top door 58. A latch mechanism 60 can be used to secure the top door 58 to the top shelter section 52. The latch mechanism 60 is preferably a biased spring latch that by default extends outwardly unless activated manually. The latch mechanism can be replaced by or used in conjunction with locks or any other securing mechanisms.

To recess the right side shelter section 72 into the top shelter section 52, the locks 100 at the bottom of the right side shelter section must disengage with the right side shelter section 72. Once the locks 100 are disengages, the bottom edge 73 of the right side shelter section 72 is rotated generally outwardly and upwardly from the pet shelter 50 so that the right side shelter section 72 rotates about a longitudinal axis of the rods 74.

Once the right side shelter section 72 is partially outwardly rotated, the right side shelter section 72 can be pushed generally inwardly so that the rods 74 slide within the slotted guide 56 until the entire guide following door 72 is positioned underneath the top shelter section 52 of the pet shelter 50. Once the right side shelter section 72 is positioned entirely underneath the top shelter section 52, the right side shelter section 72 is preferably detachably secured to the top shelter section 52 by an interference fit between the guide following door 72 and the top section.

Referring specifically to FIG. 27, some of the wire or rod stock that forms the guide following door 72 forms outwardly bowed sections 75. These bowed sections 75 are preferably configured to create an interference fit with the top shelter section when the two are pressed together. This allows for the guide following door 72 to be easily opened and fixed in position while placing a pet in or removing a pet from the pet shelter 50. The guide following door 72 provides a third door that makes the pet shelter of the present invention functionally superior to prior pet cages with fewer doors. Furthermore, the guide following door 72 can be used to expose an entire side of the pet shelter to provide a more open feeling shelter to a pet.

To continue with the process of moving the pet shelter from the second use configuration to the first compact configuration, after the right side shelter section 72 is recessed into the top shelter section 52 of the pet shelter 50, the left side shelter section 76 of the pet shelter is recessed into the bottom shelter section 82 or the tray 84 of the pet shelter 50. Referring to FIGS. 6 and 28-31 the left side shelter section 76 preferably forms a bifold door 76 including a top bifold section 80 and a bottom bifold section 78.

It is preferred that the top bifold section 80 is attached to the bottom bifold section 78 via hinge connections or the like. To recess the bifold door 76, the top bifold section 80 is rotated outwardly and downwardly away from the pet shelter 50 about an upper edge 79 of the bottom bifold section 78. Once the upper bifold section 80 is rotated into an adjacent facing position with the lower bifold section 78, the bottom and top bifold sections 78, 80 are together rotated generally inwardly into the pet shelter 50 and positioned on the bottom shelter section 82 or on the tray 84.

Referring to FIGS. 6 and 7, after the left and right side shelter sections 72, 76 have been recessed, the top shelter section 52 is detached from front and rear shelter sections 62, 70. The top shelter section is preferably detachably engaged with the front and rear shelter sections 62, 70 using clips 103. However, any other known detachable engagement mechanism can be used without departing from the present invention.

Referring to FIGS. 6 and 22-24, the rear shelter section 70 is preferably connected to a portion of the bottom shelter section 82 via a hinge or other connector. Those of ordinary skill in the art will appreciate from this disclosure that the rear shelter section 70 can be connected to the top shelter section 52 by a hinge or the like without departing from the scope of the present invention.

Referring to FIGS. 6 and 14-16, the front shelter section 62 is preferably also connected to a portion of the bottom shelter section 82 via a hinge or other connector. The front shelter section 62 defines a front opening 64 therein. The lateral sides of the front shelter section 62 are preferably rounded as shown in FIG. 16. Those of ordinary skill in the art will appreciate from this disclosure that the front shelter section 62 can be connected to a portion of the top shelter section 52 using any known connector without departing from the scope of the present invention.

Referring to FIGS. 17-21, a front door 66 is used to close the front opening 64. A latch mechanism 68 can be used to secure the front door 66 in the closed position. The latch mechanism 68 is preferably a biased spring latch that by default extends outwardly unless activated manually. It is also preferable that a lock (not shown) can be used in conjunction with the front door.

Referring to FIG. 1, to complete the process of moving the pet shelter 50 from the second use configuration to the first compact configuration, once the guide following door 72 is recessed into and secured to the top shelter section 52; the bifold door 76 is recessed into the base 82 or tray 84; and the front and rear shelter sections 62, 70 are rotated down onto the bottom shelter section 82 or the tray 84, the top shelter section 52 is lowered toward the bottom shelter section 82 and secured thereto using locks 100 or any other securing mechanism. Depending upon the size of the pet shelter 50, a handle 101 can be used to carry the pet shelter 50 as a brief case or a piece of luggage or alternatively, a handle 94 can be used to roll the pet shelter 50 during transportation.

Referring to FIGS. 32-28, a tray 84 is preferably positioned in the bottom shelter section 82 to provide a comfortable surface for a pet. The tray 84 can be grooved to provide run off for liquids if desired. Additionally, the tray may include a logo 86 if desired.

Referring to FIGS. 6 and 39, an extension 88 can be, but is not necessarily, used with the tray 84 to protect the wheels 92 from the tray and/or a pet located in the pet shelter. FIGS. 40a-40h illustrate a preferred configuration for some of the wheels 92, corner covers 90, edge covers 98, clips 102 and wheel brackets 104.

While a preferred embodiment of the present invention has been described in detail, it is recognized by those skilled in the art that changes may be made to the above described embodiments of the invention without departing from the broad inventive concept thereof. It is understood, therefore, that this invention covers all modifications which are within the spirit and scope of the invention as defined by the appended claims and/or shown in the attached drawings.

What is claimed is:

1. A pet shelter comprising:
   a non-deformable steel cage defining six sections and movable between an expanded configuration wherein the steel cage defines a space therein suitable for the enclosure of a pet and a collapsed configuration wherein the six sections are generally parallel;

deformable pieces removably attachable about a perimeter of each one of the sections;
a horizontally extending top shelter section; and
a vertically extending side shelter section formed by a guide following door, wherein the guide following door can be recessed into the pet shelter to a position adjacent, underneath and generally parallel to the top shelter section when in the expanded configuration, the side shelter section including at least one bowed section received by at least one opening in the top shelter section and frictionally retained therein to form an interference fit with the top shelter section when the side shelter section is recessed thereunder.

2. The pet shelter of claim 1, wherein the deformable pieces are oriented on corners of the steel cage.

3. The pet shelter of claim 1, wherein the deformable pieces are oriented on edges of the steel cage.

4. The pet shelter of claim 1, wherein the deformable pieces are oriented to engage points of intersection between sides of the cage.

5. The shelter of claim 1, wherein at least one of the deformable pieces comprise wheels.

6. The shelter of claim 1, wherein at least one of the deformable pieces comprises a retractable handle.

7. The shelter of claim 1, wherein the steel cage is suitable for transport of the shelter when in the collapsed configuration.

8. The shelter of claim 1, wherein the guide following door recesses underneath and adjacent the top shelter section through engagement between a slotted guide on the top shelter section and corresponding rods on the guide following door.

9. A pet shelter comprising:
a non-deformable steel cage defining a space therein suitable for the enclosure of a pet;
a horizontal top shelter section;
a horizontal bottom shelter section;
a first vertical lateral side wall extending between the top shelter section and the bottom shelter section and forming a bifold door, the first lateral side wall being positionable between the top and bottom shelter sections and the bifold door being recessable into the bottom shelter section; and
a second lateral side wall extending between the top shelter section and the bottom shelter section and forming guide following door that is recessable to a position underneath and generally parallel to the top shelter section, the guide following door including at least one bowed section received by at least one opening in the top shelter section and frictionally retained therein to form an interference fit with the top shelter section when the side shelter section is recessed thereunder.

10. A pet shelter comprising:
a non-deformable steel cage defining a space therein suitable for the enclosure of a pet;
a front shelter section having a front door thereon;
a horizontally extending top shelter section engageable with the front shelter section and having a top door thereon, the top shelter section being formed of a first plurality of rods defining openings therebetween;
a bottom shelter section forming a base of the pet shelter; and
a vertically extending lateral side formed of a second plurality of rods including at least one outwardly bowed rod portion and being positionable between the top and bottom shelter sections and being formed by a guide following door that is recessable into the pet shelter to a stowed position underneath and generally parallel to the top shelter section such that the at least one outwardly bowed rod portion is received and frictionally engaged within a respective opening of the top shelter section in an interference fit to retain the guide following door in the stowed position.

11. The shelter of claim 10, wherein the guide following door recesses underneath and adjacent the top shelter section through engagement between a slotted guide on the top shelter section and corresponding rods on the guide following door.

12. A pet shelter, comprising:
a horizontally extending top shelter section; and
a vertically extending side shelter section formed by a guide following door, wherein the guide following door recesses into the pet shelter to a position adjacent, underneath and generally parallel to the top shelter section along a slotted guide in the top shelter section, the side shelter section including at least one bowed section received by at least one opening in the top shelter section and frictionally retained therein to form an interference fit with the top shelter section when the side shelter section is recessed thereunder for detachably securing the side shelter section to the top shelter section.

13. The shelter of claim 12, wherein the guide following door comprises rods that extend from the door and slidably engage the slotted guide in the top shelter section.

14. The shelter of claim 13, wherein the rods extend horizontally and the guide following door recesses into the pet shelter by rotation the guide following door about a longitudinal axis of the rods, followed by sliding of the rods within the slotted guide.

15. The shelter of claim 12, wherein the guide following door recesses into the pet shelter by rotation of the guide following door about a horizontally extending axis at a top edge of the door, followed by sliding of the door in a direction generally parallel to the top shelter section to the position adjacent, underneath and generally parallel to the top shelter section.

* * * * *